United States Patent [19]

Miyata et al.

[11] Patent Number: 4,666,769

[45] Date of Patent: May 19, 1987

[54] MAGNETIC DISC

[75] Inventors: Teruhisa Miyata; Akira Miyake, both of Kyoto; Masaya Funahashi, Osaka, all of Japan

[73] Assignee: Hitachi Maxell, Ltd., Osaka, Japan

[21] Appl. No.: 776,694

[22] Filed: Sep. 16, 1985

[30] Foreign Application Priority Data

Sep. 18, 1984 [JP] Japan .................. 59-196263

[51] Int. Cl.$^4$ ..................... G11B 5/68; G11B 5/82
[52] U.S. Cl. .................... 428/323; 427/131; 428/402; 428/408; 428/694; 428/695; 428/900
[58] Field of Search ............ 428/695, 694, 423.1, 428/315.5, 323, 315.9, 317.9, 408, 402; 427/131; 360/134–136

[56] References Cited

U.S. PATENT DOCUMENTS

| | | | |
|---|---|---|---|
| 4,183,976 | 1/1980 | Yamada et al. | 427/131 |
| 4,528,240 | 7/1985 | Miyoshi et al. | 428/328 |
| 4,546,035 | 10/1985 | Ko et al. | 428/695 |

*Primary Examiner*—Paul J. Thibodeau
*Attorney, Agent, or Firm*—Birch, Stewart, Kolasch & Birch

[57] ABSTRACT

A magnetic disc comprising a non-magnetic substrate, an undercoat coated on the surfaces of the substrate and a magnetic layer containing magnetic powder dispersed in a binder coated on the undercoat, characterized in that the undercoat has a thickness of from 0.5 to 10.0 μm and such a porosity that a lubricant is contained therein in an amount of from 30 to 200 mg/cm$^3$, which provides good surface lubricity and improved durability.

6 Claims, No Drawings

MAGNETIC DISC

BACKGROUND OF THE INVENTION

1. Field of the Invention

The present invention relates to a flexible magnetic disc. More particularly, it relates to a flexible magnetic disc with good surface lubricity, improved durability and decreased drop out as well as good electrical properties.

2. Discussion of Prior Art

In order to increase resolution of a magnetic disc in high density recording at a short wavelength, various losses such as spacing loss, loss due to a medium thickness and self-demagnetization loss should be decreased. These losses are preferably decreased by making the magnetic layer of the magnetic disc very thin. Therefore, the thickness of the magnetic layer is usually made as thin as 1 $\mu$m. When the thickness of the magnetic layer is, however, made so thin, several problems occur:

(1) When the thickness of the magnetic layer is as thin as 1 $\mu$m, the cohesive force of the magnetic layer itself is decreased. In addition, since an absolute amount of a lubricant which imparts lubricity on the surface of the magnetic disc in the magnetic layer is decreased, the durability of the magnetic disc deteriorates;

(2) When thickness of the magnetic layer is as thin as 1 $\mu$m, the magnetic layer tends to be affected by properties of a surface of a non-magnetic flexible substrate. That is, characteristics of the magnetic layer are directly influenced by minute roughness, flaws or fish eyes on the surface of the substrate and/or fillers or oligomers contained in the substrate. This causes minute fluctuation of output or drop out;

(3) Surface electric resistance of the magnetic layer greatly varies with the thickness of the layer and exponentially increases as the thickness of the layer decreases. Therefore, when the thickness of the magnetic layer is 1 $\mu$m, the surface resistance becomes rather large so that the layer tends to be electrified. Thus, discharge between the surface of the magnetic disc and a magnetic head causes electrostatic noise, which is one source of error.

Various proposals have been made to solve these problems. Now, such proposals will be discussed. For example, to mainly solve the above described problem (1), it has been proposed to add a hard solid additive, such as $Al_2O_3$ or $Cr_2O_3$. Although durability of the magnetic disc is improved by this technique, the above described problems (2) and (3) are not solved. In addition, the solid additive may abrade the magnetic head. On the other hand, it is known that the problems (2) and (3) are solved by increasing smoothness of the surface of the non-magnetic flexible substrate or by reducing direct effect of the surface properties of the substrate to the magnetic layer. This is achieved by coating the surface of the substrate with an undercoat comprising a binder made of a polyester or polyurethane resin and optionally a cross linking agent or a resin having radiation sensitive functional groups, or an undercoat comprising a binder and electrically conductive fine powder which reduces electric resistance, being dispersed in the binder having a thickness of about 0.5 $\mu$m to about 5.0 $\mu$m and applying the magnetic layer on the undercoat. In addition, the undercoat improves adhesiveness between the magnetic layer and the substrate. However, this technique does not improve the durability of the magnetic disc and does not solve problem (1).

When the durability of the magnetic disc is discussed, two categories of durability should be investigated, one of which relates to continuous traveling (hereinafter referred to as "traveling durability") and another of which is against impact force generated when the magnetic head catches the magnetic disc like a clip (hereinafter referred to as "tap durability"). When the thickness of the magnetic layer is about 2.5 $\mu$m, good traveling durability is achieved by applying and impregnating a suitable amount of a lubricant on the surface of the magnetic disc after the application of the magnetic coating and/or by adding the lubricant to the magnetic coating composition. However, when the magnetic layer is as thin as 1 $\mu$m, the cohesive force of the magnetic layer itself is reduced, and the absolute amount of the lubricant impregnated or present in the magnetic layer so small that it cannot improve the durability. If the lubricant is forced to be impregnated in or added to the magnetic layer in a large amount, the binder is plasticized by the lubricant so that the mechanical properties of the magnetic layer and, in turn, the durability of the magnetic disc may deteriorate. In this case, a large amount of the lubricant bleeds out on the surface of the magnetic layer so that the surface becomes sticky and foreign particles easily adhere to the surface. Further, the magnetic head and the magnetic disc stick to or absorb each other. As to tap durability, when the magnetic disc comprises a flexible substrate as thick as about several tens of $\mu$ms and a magnetic layer as thin as 1 $\mu$m, the magnetic disc has a poorer ability to relax the impact force due to tap than a magnetic disc having a comparatively thick magnetic layer, and brittle fracture due to fatigue of the magnetic layer tends to result, which may result in drop out. To improve the durability of the magnetic disc, many attempts have been made including the addition of a solid additive to the magnetic layer as described above, the use of a new material which can impart lubricity to the magnetic layer, improvement of the binder and selection of a new magnetic material and/or reinforcement. However, these attempts have not satisfactorily solved the problems.

SUMMARY OF THE INVENTION

One object of the present invention is to provide a magnetic disc with improved traveling and tap durability.

Another object of the present invention is to provide a magnetic disc with sufficiently decreased surface electric resistance and modulation noise.

A further object of the present invention is to provide a magnetic disc with improved electro-magnetic conversion.

SUMMARY OF THE INVENTION

To achieve these objects, extensive studies have been carried out according to the following:

(a) An undercoat is to be applied on the surface of a non-magnetic flexible substrate so as to prevent the direct influence of the surface characteristics of the substrate on the magnetic layer; and (b) Electrically conductive fine powder is to be added to the undercoat. The durability of the magnetic disc is to be improved by imparting an ability for improving the durability to the undercoat instead of the addition of the solid additive in the magnetic layer. To this end, the undercoat is made porous so that a specific amount of lubricant is contained therein, and a suitable amount of the lubricant comes out on the surface of the magnetic layer so as to give lubricity to it. That is, a large amount of the impregnated lubricant is distributed between the undercoat and the magnetic layer in a well balanced condition.

Therefore, the surface of the magnetic disc does not become sticky while a suitable amount of the lubricant is extracted from the magnetic layer when the magnetic disc is in contact with the magnetic head. In addition, the porous undercoat acts as a cushion member relaxing the impact force and improving the tap durability.

DETAILED DESCRIPTION OF THE INVENTION

The present invention is based on the above findings and provides a magnetic disc comprising a non-magnetic substrate, an undercoat coated on the surface of the substrate and a magnetic layer containing magnetic powder dispersed in a binder coated on the undercoat, characterized in that the undercoat comprises a resin and has a thickness of from 0.5 to 10.0 μm and such a porosity that a lubricant is contained therein in an amount of from 30 to 200 mg/cm$^3$. Preferably, the undercoat further comprises electrically conductive fine powder, such as carbon black, having a specific surface area of not less than 100 m$^2$/g and an average particle size of not greater than 40 mμ. In addition, the undercoat preferably has a surface roughness of not greater than 0.035 μm.

The non-magnetic flexible substrate may be the same as one used for the production of a conventional magnetic disc and is made of a plastic material such as polyesters (e.g., polethylene terephthalate and polyethylene 2,6-naphthalate), cellulose acetates (e.g. cellulose di- or tri-acetate), polyimide and polyamide. The thickness of the substrate is usually from about 10 to 100 μm.

Specific examples of the resin used in the undercoat are polyurethane, polyester and vinyl chloride-vinyl acetate copolymers. In view of the flexibility of the undercoat, polyurethane is preferably used. As the polyurethane, those having terminal isocyanate groups or hydroxyl groups such as polyester-polyurethane and polyether-polyurethane may be used. Commercially available polyurethane includes Takenate M-407 (Trade Name, manufactured by Takeda Chemical), Pandex T-5250 and T-5201 and Crysbon 4565, 7209, 6407 and 6109 (Trade Name, all manufactured by Dainippon Ink), Desmophene 1200 (Trade Name, manufactured by Bayer). As a cross linking agent, isocyanate is preferably used. Commercially available cross linking agents are Desmodule L (trade name, manufactured by Bayer) and Colonate L (trade name, manufactured by Nippon Urethane).

Specific examples of the optionally used electrically conductive fine powder are carbonaceous powder (e.g., carbon black, graphite and graphitized carbon black), metal or alloy powder (e.g. silver, copper, tin, aluminum, zinc, chromium and titanium and their alloys) and mixtures thereof. Carbon black, particularly Mogal L (manufactured by Cabot, USA.), is preferred. Mogal L has an average particle size of 24 mμ, oil absorption value of 60 ml/100 g (DBP) and a specific surface area of 138 m$^2$/g.

The weight ratio of the resin and the electrically conductive fine powder to be contained in the undercoat is from 20:80 to 80:20. When the content of the electrically conductive fine powder is too small, enough pores for containing the lubricant are not formed in the undercoat. On the contrary, when it is too large, the adhesivity between the undercoat and the magnetic layer is deteriorated. In addition, the number of pores becomes too large so that the solvent contained in the magnetic coating is undesirably impregnated in the undercoat.

The components of the undercoat, such as the resin and the electrically conductive fine powder, are mixed together with a solvent by means of a dispersing apparatus such as a ball mill, sand mill or pebble mill to produce a coating composition. Specific examples of the solvent are toluene, xylene, methyl ethyl ketone, methyl isobutyl ketone, cyclohexanone, acetone, tetrahydrofuran, ethyl acetate, dimethylformamide and mixtures thereof. The coating composition is coated on the surface of the substrate by means of a knife coater, a gravure roll coater, a reverse roll coater and the like. Viscosity of the composition is adequately adjusted. Preferably, the solid content is at least 10%, more preferably at least 20%. When the coating composition is coated to a thickness of from 0.5 to 10 μm at room temperature, the dried undercoat has such porosity that about 200 mg of the lubricant per cm$^3$ is impregnated and the surface roughness is no larger than 0.035 μm. When the substrate with the undercoat is calendered, the porosity and surface roughness are further decreased such that about 30 mg of the lubricant per cm$^3$ is impregnated and the surface roughness is not larger than 0.030 μm. When a mixture containing the polyurethane resin and the cross linking agent is used as the undercoat resin, the formed undercoat not only has a cushioning effect which serves to increase the tap durability but also prevents the loss of the smoothness at the interface between the undercoat and the magnetic layer due to dissolution of the undercoat in the solvent contained in the magnetic coating and elution of the resin of the undercoat in the solvent during application of the magnetic coating. Therefore, the disc produced has a high S/N characteristic with small fluctuation of output and modulation noise.

The magnetic powder contained in the magnetic layer is any one of the conventionally used magnetic powders, such as iron powder, cobalt powder, metal alloy powder (e.g., iron-nickel, nickel-cobalt, iron-cobalt alloys), γ-Fe$_2$O$_3$ powder, Fe$_3$O$_4$ powder, powder of intermediate oxide of these two iron oxides and powder of the iron oxide modified with cobalt. Among them, the cobalt-modified iron oxide powder is preferred. A particle of the magnetic powder is preferably of a needle like or granular shape. Preferably, the magnetic power has saturation magnetization ($\sigma_s$) of at least 65 emu/g and coersive force (Hc) of at least 200 Oe.

Specific examples of the binder which binds the magnetic powder are polyvinyl chloride, polyvinyl acetate, vinyl chloride/vinyl acetate copolymer, vinyl chloride/vinyl acetate/vinyl alcohol copolymer, polyurethane, cellulose type resin, polyester or sulfonated polyester, vinylidene chloride/acrylonitrile copolymer, isoprene rubber, butadiene rubber and mixtures thereof. Optionally, a cross linking agent such as low molecular weight isocyanate compound is used.

The magnetic layer may be formed by mixing the magnetic powder, the binder and optionally other additives (e.g., surfactants, lubricants, abrasive powder, etc.) in the solvent as exemplified above and coating the composition on the undercoat in the same manner as the undercoat application. After drying the coated composition, the magnetic disc may be calendered.

When the magnetic layers are formed on both surfaces of the substrate, the undercoats are preferably applied on both surfaces and then the magnetic layers are formed on the undercoats. In this case, the calendering is preferably carried out after the undercoats are applied on both surfaces. If, on one surface of the substrate the undercoat is applied and the magnetic layer is formed and thereafter, on another surface, the undercoat is applied and the magnetic layer is formed, the magnetic disc undesirably tends to curl.

After the magnetic layer is formed, the lubricant is impregnated in the undercoat and the magnetic layer to impart lubricity to the surface of the magnetic layer. The lubricant may be added in the undercoat coating and/or the magnetic coating.

Examples of the lubricant are fatty acids (e.g., myristic acid, palmitic acid, etc.), fatty acid esters (e.g., butyl stearate, butyl palmitate, etc.), hydrocarbons (e.g., liquid paraffins, etc.), fluorine-containing compounds (e.g., perfluoropolyethers, etc.), silicone compounds (e.g., dimethylpolysiloxane, etc.).

PREFERRED EMBODIMENTS

The present invention will be hereinafter explained in further detail by the following examples, wherein part and % are by weight unless otherwise indicated.

EXAMPLE 1

An undercoat coating having the following composition was prepared by dispersing the components in a ball mill:

| Undercoat Coating | Parts |
| --- | --- |
| Carbon black | 100 |
| (Mogal L manufactured by Cabot) | |
| Vinyl chloride/vinyl acetate/ vinyl alcohol copolymer | 27 |
| (VAGH manufactured by U.C.C.) | |
| Polyester-polyurethane | 27 |
| (T 5250 manufactured by Dainippon Ink) | |
| Tri-functional low molecular weight isocyanate | 13 |
| (Colonate L manufactured by Nippon Urethane Industries) | |
| Cyclohexanone | 287 |
| Toluene | 287 |

The coating was applied on both surfaces of a polyester film with a thickness of 75 μm and dried followed by calendering to obtain the undercoats on both surfaces each having a thickness of 1.0 μm and surface roughness of 0.020 μm. The surface roughness expressed in C.L.A. (center line average) was measured by means of a tracer type surface roughness tester (Tokyo Seimitsu) under a condition of cut off of 0.08 mm.

On each calendered undercoat, a magnetic coating having the following composition was coated to form a magnetic layer with a thickness of 1.0 μm after dried:

| Magnetic Coating | Parts |
| --- | --- |
| $\gamma$-Fe$_2$O$_3$ magnetic powder | 300 |
| (Ho 650 Oe, $\sigma_s$ 72 emu/g) | |
| Vinyl chloride/vinyl acetate/ vinyl alcohol copolymer | 57 |
| (VAGH manufactured by U.C.C.) | |
| Acrylonitrile/butadiene copolymer | 11 |
| (N 1432J manufactured by Nippon Zeon) | |
| Tri-functional low molecular weight isocyanate | 7 |
| (Colonate L manufactured by Nippon | |

| Magnetic Coating | Parts |
| --- | --- |
| Urethane Industries) | |
| Carbon black | 34 |
| (HS-500 manufactured by Asahi Carbon) | |
| $\alpha$-Fe$_2$O$_3$ powder | 11 |
| Methyl isobutyl ketone | 420 |
| Toluene | 420 |

The dried magnetic layers were then calendered. Thereafter, a mixture of oleyl oleate (48 parts), stearic acid (2 parts) and hexane (1,000 parts) was applied on the magnetic layers to impregnate the lubricant in the magnetic layers and the undercoats. From the thus coated film, a magnetic disc was blanked.

EXAMPLE 2

In the same manner as in Example 1 but adding oleyl oleate (20 parts) in the undercoat coating, a magnetic disc was produced.

EXAMPLE 3

In the same manner as in Example 1 but not calendering the undercoat so that the surface roughness was 0.030 μm, a magnetic disc was produced.

COMPARATIVE EXAMPLE 1

In the same manner as in Example 3 but using an undercoat coating having the following composition and applying the undercoat with a thickness of 0.3 μm and surface roughness of 0.040 μm, a magnetic disc was produced.

| Under Coating | Parts |
| --- | --- |
| Carbon black | 10 |
| (SC carbon manufactured by Columbia Chemical) | |
| Polyester | 25 |
| (Bylon TS-9504 manufactured by Toyobo) | |
| Methyl ethyl ketone | 200 |
| Cyclohexanone | 100 |

COMPARATIVE EXAMPLE 2

In the same manner as in Example 1 but forming no undercoat and directly coating the magnetic coating on the polyester film, a magnetic disc was produced.

The magnetic discs produced in Examples and Comparative Examples were tested on traveling durability on one track, tap durability, surface electric resistance and modulation noise. The results are shown in following Table.

TABLE

| Example No. | Traveling durability (times) ($\times 10^4$) | Tap durability (times) | Surface electric resistance (ohm) | Modulation noise (dB) |
| --- | --- | --- | --- | --- |
| 1 | 1,050 | 23,000 | $7 \times 10^4$ | $-3.5$ |
| 2 | 1,200 | 20,000 | $8 \times 10^4$ | $-3.5$ |
| 3 | 1,100 | 22,000 | $9 \times 10^4$ | $-2.5$ |
| Comp. 1 | 600 | 7,500 | $7 \times 10^4$ | $+1.5$ |
| Comp. 2 | 500 | 6,000 | $2 \times 10^9$ | $-3.5$ |

The above properties are measured as follows:

TRAVELING DURABILITY

The magnetic disc is loaded on a 5 inch floppy disc drive installed in a test room in which temperaturehumidity condition alters every 7 hours between 5° C./40 % RH and 45° C./80 % RH and continuously run on one track till the magnetic layer is flawed by the contact sliding against the magnetic head.

TAP DURABILITY

The magnetic disc is loaded on a 5 inch floppy disc drive installed in a test room kept at 45° C. and 80 % RH. Under a tap condition of 3 times/sec. (3 time on and off per second of the magnetic head with 360 rpm), tap impact was applied on the same part of the magnetic disc till drop out occurs.

SURFACE ELECTRIC RESISTANCE

The magnetic disc is cut out in a strip with a width of ½ inch and bridged between a pair of quadrant cylinder shaped electrodes, which are horizontally positioned at equal space of ½ inch. At each end of the strip, a load of 160 g is applied. Then, resistance of the strip between the electrodes is measured.

MODULATION NOISE

The magnetic disc is loaded on a 5 inch floppy disc drive and recorded and reproduced under conditions of write frequency of 125 KHz, the number of revolutions of 360 rpm, recording density of 9 KBPI and a track width of 75 μm in a test room kept at 10° C. and 40 % RH. The modulation noise under these conditions are measured and expressed by a noise level at 120 KHz.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic disc comprising a non-magnetic substrate, at least one undercoat coated on at least one surface of said substrate and a magnetic layer containing magnetic powder dispersed in a binder coated on at least one said undercoats, said at least one undercoat comprising a resin and a fine powder in a weight ratio of 20:80 to 80:20 and optionally a cross linking agent having a thickness of from 0.5 to 10.0 μm and such a porosity that a lubricant is contained therein in an amount of from 30 to 200 mg/cm$^3$.

2. A magnetic disc according to claim 1, wherein sad resin is selected from at least one member of the group consisting of polyether-polyurethane and polyester-polyurethane.

3. A magnetic disc according to claim 1, wherein said fine powder is electrically conductive having a specific surface area of not less than 100 m$^2$/g and an average particle size of not larger than 40 mμ.

4. A magnetic disc according to claim 3, wherein said electrically conductive fine powder is selected from at least one member of the group consisting of carbon black, graphite and graphitized carbon black.

5. A magnetic disc according to claim 3, wherein said electrically conductive fine powder is a metal or metal alloy powder.

6. A magnetic disc according to claim 1, wherein said at least one undercoat has surface roughness of not greater than 0.035 μm.

* * * * *